G. H. CRAMER.
GEAR FASTENER FOR MERRY-GO-ROUNDS AND THE LIKE.
APPLICATION FILED JAN. 22, 1916.
1,187,267.
Patented June 13, 1916.
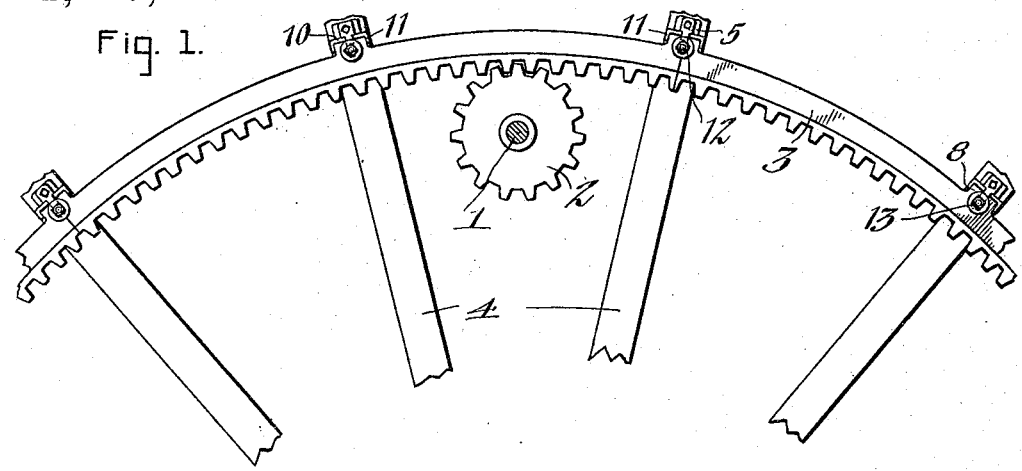
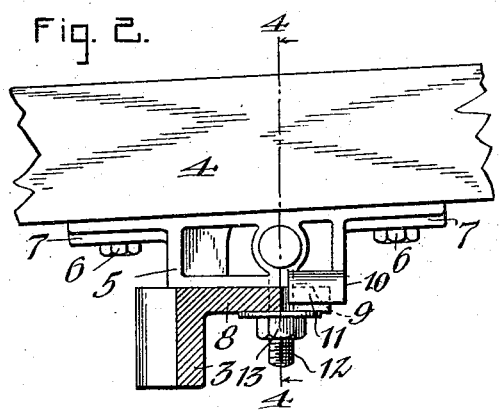
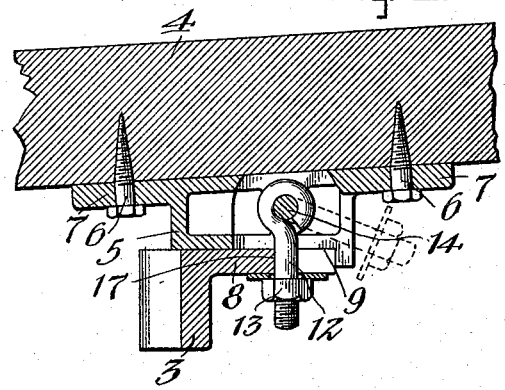
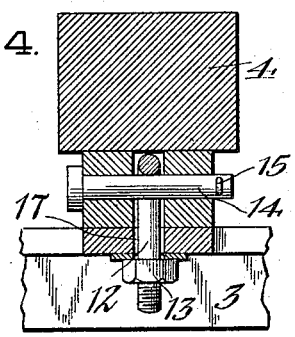
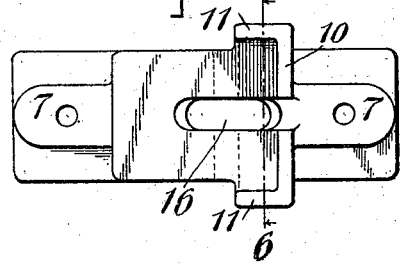
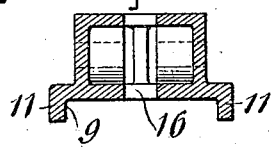
INVENTOR
George H. Cramer,
by Geyer Popp
ATTORNEYS

UNITED STATES PATENT OFFICE.

GEORGE H. CRAMER, OF NORTH TONAWANDA, NEW YORK, ASSIGNOR TO HERSCHELL-SPILLMAN COMPANY, OF NORTH TONAWANDA, NEW YORK, A CORPORATION OF NEW YORK.

GEAR-FASTENER FOR MERRY-GO-ROUNDS AND THE LIKE.

1,187,267.  
Specification of Letters Patent.  
Patented June 13, 1916.

Application filed January 22, 1916. Serial No. 73,591.

*To all whom it may concern:*

Be it known that I, GEORGE H. CRAMER, a citizen of the United States, residing at North Tonawanda, in the county of Niagara and State of New York, have invented new and useful Improvements in Gear-Fasteners for Merry-Go-Rounds and the like, of which the following is a specification.

This invention relates to the means for securing the comparatively-large sectional gear of a carousel or merry-go-round to the radial arms or sweeps of the machine. Heretofore this sectional gear has been secured to the sweeps by ordinary bolts, and as a great many of such bolts and nuts are necessary for this purpose, considerable time is required to assemble and dismember the sections. This is especially objectionable in the case of machines which have to be set up and taken down almost daily, like those following circuses, fairs and carnival companies.

One object of my invention is to produce a simple, strong and inexpensive fastening device of this character.

A further object is the provision of a fastening which is always ready for use and not liable to be lost and which can be easily and quickly manipulated for assembling and removing the gear-sections.

In the accompanying drawings: Figure 1 is a fragmentary bottom plan view of the sweeps of a merry-go-round showing the improved fastening means. Fig. 2 is a fragmentary side elevation of one of the sweeps with the fastener applied thereto, showing the gear in section. Fig. 3 is a vertical longitudinal section thereof. Fig. 4 is a cross section on line 4—4, Fig. 2. Fig. 5 is a bottom plan view of one of the fastening blocks. Fig. 6 is a transverse section thereof on line 6—6, Fig. 5.

Similar characters of reference indicate corresponding parts throughout the several views.

1 indicates the upright driving shaft of the machine connected to a motor or other source of power, not shown, and provided with a gear pinion 2 which meshes with the customary sectional gear 3 secured to the radial arms or sweeps 4, thereby rotating the same. Each section of this gear is fastened at its ends and midway thereof by my improved fastening devices, one of which is preferably mounted on the underside of each sweep. Each of these devices preferably comprises a skeleton frame or hollow block 5, permanently secured to the sweep by screws or bolts 6, passing through perforated ears 7 at opposite ends of the block.

At the points where the gear sections are fastened to the blocks 5, they are provided with outwardly-extending lugs or projections 8 which engage in seats or sockets 9 arranged in the undersides of the blocks. These sockets are preferably made integral with the blocks and each of them has a depending front wall 10 and depending side walls 11 which insure the accurate positioning of the lugs 8 in assembling the gear-sections and hold the sections from outward as well as longitudinal or circumferential displacement.

The gear-sections are removably secured in their seats in the blocks by swiveling eye bolts 12 having clamping nuts 13 and pivoted to the blocks by pins 14, permanently held in place by cotter-pins 15 or other suitable fastenings. Each of these bolts passes through a slot 16 arranged radially in the corresponding block and engages with a notch 17 in the adjacent gear-lug, as shown by full lines in Fig. 3, whereby the lug is firmly secured in the socket of the block upon tightening the nut of the bolt. The slots extend to the outer ends of the blocks to allow the eye bolts to be swung into and out of engagement with the notched lugs.

When it is desired to remove the gear-sections from the sweeps, the nuts of the eye bolts are loosened and the bolts swung outwardly to the position shown by dotted lines in Fig. 3, releasing the sections and permitting their lugs to be withdrawn from the block-seats or sockets.

While affording the advantages of simplicity of construction and low cost, these fastening devices are not liable to be lost like ordinary removable bolts, and as the clamping nuts of the bolts need not be removed, the parts can be quickly assembled and taken apart, rendering the improvement especially desirable for traveling merry-go-rounds, although the same is also applicable to other similar structures.

I claim as my invention:

1. The combination of the rotary sweeps of a merry-go-round, a driving gear for said sweeps having projections extending from the annular edge of its rim and arranged in a substantially parallel plane therewith, fastening blocks secured to the sweeps and having sockets constructed to receive said projections, and means for removably fastening said projections in said sockets.

2. The combination of the rotary sweeps of a merry-go-round, a gear for driving the sweeps having projections extending from its outer edge, seats carried by the sweeps and having portions which engage opposite sides of said projections to hold the gear from circumferential displacement, and means for detachably securing said projections in said seats.

3. The combination of the rotary sweeps of a merry-go-round, fastening blocks secured to said sweeps and each having a socket, a driving gear for said sweeps having projections seated in said sockets, and bolts pivoted to said blocks for removably securing the gear-projections in said sockets.

4. The combination of the rotary sweeps of a merry-go-round, slotted blocks secured to the sweeps, a driving gear for said sweeps bearing against said blocks and having notches arranged in line with the slots of the blocks, and clamping bolts pivoted in said slots and engaging said notches.

5. The combination of the rotary sweeps of a merry-go-round, fastening blocks secured to said sweeps and each having a socket in its underside and a slot intersecting said socket, a driving gear for the sweeps having notched lugs extending outwardly therefrom and seated in said sockets, and eye-bolts pivoted to said blocks to swing in said slots into and out of engagement with said notched lugs.

GEORGE H. CRAMER.

Copies of this patent may be obtained for five cents each, by addressing the "Commissioner of Patents, Washington, D. C."